US012744850B2

(12) United States Patent
Bisht et al.

(10) Patent No.: US 12,744,850 B2
(45) Date of Patent: Sep. 22, 2026

(54) SYSTEM AND METHOD FOR RESTRICTING BIT RATE FOR ENHANCED VOICE SERVICES (EVS)

(71) Applicant: JIO PLATFORMS LIMITED, Ahmedabad (IN)

(72) Inventors: Birendra Singh Bisht, Navi Mumbai (IN); Harbinder Pal Singh Saini, Navi Mumbai (IN); Anurag Sinha, Mumbai (IN); Priti Kelkar, Mumbai (IN); Dipanka Dutta, Navi Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 626 days.

(21) Appl. No.: 18/247,467

(22) PCT Filed: Mar. 24, 2023

(86) PCT No.: PCT/IB2023/052913
§ 371 (c)(1),
(2) Date: Mar. 31, 2023

(87) PCT Pub. No.: WO2023/187566
PCT Pub. Date: Oct. 5, 2023

(65) Prior Publication Data

US 2025/0016271 A1 Jan. 9, 2025

(30) Foreign Application Priority Data

Mar. 30, 2022 (IN) ............................ 202221018954

(51) Int. Cl.
*H04M 7/00* (2006.01)
*G10L 19/16* (2013.01)
(Continued)

(52) U.S. Cl.
CPC ......... *H04M 7/0072* (2013.01); *G10L 19/167* (2013.01); *H04L 65/1016* (2013.01);
(Continued)

(58) Field of Classification Search
CPC . H04M 7/0072; H04M 3/2227; G10L 19/167; G10L 19/22; G10L 19/24;
(Continued)

(56) References Cited

U.S. PATENT DOCUMENTS

2006/0007818 A1* 1/2006 Jang ...................... G11B 19/28 369/47.4
2016/0323425 A1 11/2016 Atarius et al.
(Continued)

FOREIGN PATENT DOCUMENTS

WO 2016176028 A1 11/2016
WO 2019234338 A1 12/2019
WO 2021022087 A1 2/2021

OTHER PUBLICATIONS

Spirent, "Testing the EVS Codec, Addressing Complex Challenges to Ensure Superior Audio Quality Performance", 2018. (Year: 2018).*

(Continued)

*Primary Examiner* — Michael A Keller
*Assistant Examiner* — Chhian (Amy) Ling
(74) *Attorney, Agent, or Firm* — FINNEGAN, HENDERSON, FARABOW, GARRETT & DUNNER LLP

(57) ABSTRACT

The present disclosure allows providing bit rate restriction for voice services originating from and received by wireless devices. The system and method facilitates to receive by, a communication server, a data packet from a user equipment (UE) associated with the communication server. The data packet includes a bit rate value of an EVS codec. Further, the (Continued)

bit rate value of the received data packet is compared to at least one of predefined bit rate configurations. In addition, for enhancing the EVS, the bit rate value of the received data packet is altered when the bit rate value of the received data packet matches with the at least one of predefined bit rate configurations.

15 Claims, 7 Drawing Sheets

(51) Int. Cl.

| | |
|---|---|
| ***H04L 65/1016*** | (2022.01) |
| ***H04L 65/1063*** | (2022.01) |
| ***H04L 65/75*** | (2022.01) |
| ***H04L 65/80*** | (2022.01) |
| ***H04M 3/22*** | (2006.01) |
| ***H04W 28/02*** | (2009.01) |
| *G10L 19/22* | (2013.01) |
| *G10L 19/24* | (2013.01) |

(52) U.S. Cl.
CPC .......... *H04L 65/1063* (2013.01); *H04L 65/75* (2022.05); *H04L 65/765* (2022.05); *H04L 65/80* (2013.01); *H04M 3/2227* (2013.01); *H04W 28/0268* (2013.01); *G10L 19/22* (2013.01); *G10L 19/24* (2013.01)

(58) Field of Classification Search
CPC . H04L 65/1063; H04L 65/75; H04L 65/1016; H04L 65/80; H04L 65/765; H04W 28/0268
See application file for complete search history.

(56) References Cited

U.S. PATENT DOCUMENTS

| | | | | |
|---|---|---|---|---|
| 2019/0044981 | A1* | 2/2019 | Kielhofner ............ | H04L 65/764 |
| 2021/0258363 | A1 | 8/2021 | Ragot et al. | |
| 2022/0284910 | A1 | 9/2022 | Tyagi et al. | |
| 2022/0322151 | A1* | 10/2022 | Shi ........................ | H04W 28/22 |

OTHER PUBLICATIONS

ETSI TS 126 441 V16.0.0 (Aug. 2020); Universal Mobile Telecommunications System (UMTS); LTE; Codec for Enhanced Voice Services (EVS); General overview (3GPP TS 26.441 version 16.0.0 Release 16) (Year: 2020).*

Nokia, 3GPP Enhanced Voice Services (EVS) codec, Nokia White Paper, 2017. (Year: 2017).*

3GPP, Enhanced Voice Services Codec for LTE, Nov. 7, 2014. (Year: 2014).*

VoiceAge EVS, “EVS Standard”, 2021, 4 pages (Year: 2021).*

International Search Report, PCT/IB2023/052913, mailed Jul. 18, 2023, Total Pages 03.

* cited by examiner

SYSTEM AND METHOD FOR RESTRICTING BIT RATE FOR ENHANCED VOICE SERVICES (EVS)

RESERVATION OF RIGHTS

A portion of the disclosure of this patent document contains material which is subject to intellectual property rights such as, but are not limited to, copyright, design, trademark, integrated circuit (IC) layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

TECHNICAL FIELD

The present disclosure relates to wireless devices, and more particularly to systems and methods to provide bit rate restriction for voice services originating from and received by the wireless devices in LTE networks.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The Enhanced Voice Services (EVS) codec is a conversational multi-rate codec that offers enhanced voice services over LTE (Long Term Evolution), specifically in IP Multimedia Subsystem (IMS) having packet-based access. In general, the EVS codec supports 12-bit rates ranging from 5.9 kbps to 128 kbps. Depending on the usage, a received input signal can be sampled at four sampling rates i.e., 8 KHz (Narrowband), 16 KHZ (Wideband), 32 KHZ (Super wideband) and 48 KHZ (Full band). Even though NG114 specifications require global telecom operators to support Super-Wideband (SWB) speech, the available bit rate is limited to 24.4 Kbps. Further, comparison of speech quality with Adaptive Multi-Rate-Wideband (AMR-WB) speech codec suggests that a bit rate that is less than 24.4 Kbps can provide best quality mean opinion score (MOS) while providing optimal usage of network bandwidth.

Contrary to this, during a codec negotiation procedure, end user equipment involved in a communication in a communication network is permitted to send/receive voice services at any bit rate leading to excessive bandwidth consumption and wastage which may be undesirable.

There is therefore a need in the art for controlling the bit rate for voice based services so that excessive bandwidth consumption of the wireless network is avoided.

SUMMARY

In an aspect, the present disclosure relates to a system for restricting a bit rate for enhanced voice services (EVS). The system may include a communication server communicatively coupled to a communication network. The communication server may include one or more processors coupled with a memory. The memory may store instructions to be executed by the one or more processors. The communication server may be configured to receive a data packet from a user equipment (UE) via the communication network. The data packet may include a bit rate value of an EVS codec, where the EVS codec may enhance communication quality of voice services. The communication server may be configured to compare the bit rate value of the received data packet to at least one of predefined bit rate configurations. Further, the communication server may alter the bit rate value of the received data packet when the bit rate value of the received data packet matches with the at least one of predefined bit rate configurations for enhancing the EVS.

In an embodiment, the predefined bit rate configurations may include multiple feasible variations for bit rate values of the EVS codec.

In an embodiment, the communication server may facilitate to reduce a maximum bit rate of the EVS codec to a predetermined value when the bit rate value of the received data packet matches to at least one of the predefined bit rate configurations.

In an embodiment, based on the bit rate value of the received data packet mismatching each of the predefined bit rate configurations, the one or more processors may reduce the maximum bit rate value to the predetermined value when a minimum bit rate value is less than the predetermined value. Further, the one or more processors may replace the received bit rate value to the predetermined value when the minimum bit rate value is equal to the predetermined value. The one or more processors may maintain the received bit rate value when the minimum bit rate value is higher than the predetermined value.

In an embodiment, the communication server may correspond to a Converge Telephony Application Server (CTAS).

In an embodiment, the communication server may be configured to modify a bit rate parameter of the received data packet.

In an aspect, the present disclosure relates to a method for restricting a bit rate for enhanced voice services (EVS). The method may include receiving, by a communication server, a data packet from a user equipment (UE) associated with the communication server. The data packet may include a bit rate value of an EVS codec. The method may include comparing, by the communication server, the bit rate value of the received data packet to at least one of predefined bit rate configurations. Further, the method may include altering, by the communication server, the bit rate value of the received data packet when the bit rate value of the received data packet matches with the at least one of predefined bit rate configurations for enhancing the EVS.

In an embodiment, the predefined bit rate configurations may include multiple feasible variations for bit rate values of the EVS codec.

In an embodiment, the method may include facilitating, by the communication server, a maximum bit rate of the EVS codec to a predetermined value when the bit rate value of the received data packet matches to at least one of the predefined bit rate configurations.

In an embodiment, based on the bit rate value of the received data packet mismatching each of the predefined bit rate configurations, the method may include reducing, by the communication server, the maximum bit rate value to the predetermined value when a minimum bit rate value is less than the predetermined value. The method may include replacing, by the communication server, the received bit rate value to the predetermined value when the minimum bit rate value is equal to the predetermined value. Further, the method may include maintaining, by the communication server, the received bit rate value when the minimum bit rate value is higher than the predetermined value.

In an embodiment, the communication server corresponds to a Converge Telephony Application Server (CTAS).

In an embodiment, the method may include modifying, by the communication server, a bit rate parameter of the received data packet.

In an aspect, the present disclosure relates to a user equipment communicatively coupled to a communication server. The user equipment may include one or more primary processors communicatively coupled to one or more processors of the communication server, the one or more primary processors coupled with a memory, where the memory stores instructions which when executed by the one or more primary processors causes the user equipment to transmit a data packet to the communication server via a communication network. The communication server may be configured to receive the data packet from the UE, where the data packet includes a bit rate value of an enhanced voice services (EVS) codec, compare the bit rate value of the received data packet to at least one of predefined bit rate configurations, and alter the bit rate value of the received data packet when the bit rate value of the received data packet matches with the at least one of predefined bit rate configurations for enhancing the EVS.

In an aspect, the present disclosure relates to a non-transitory computer-readable medium including processor-executable instructions that causes a processor to perform the steps of the method, as discussed above.

Objects of the Present Disclosure

It is an object of the present disclosure to provide bit rate restriction for voice services originating from and received by wireless devices.

It is an object of the present disclosure to provide a codec selection mechanism to improve bandwidth consumption of a wireless network.

It is an object of the present disclosure to provide mechanisms for selecting varying Enhanced Voice Services (EVS) codecs for voice calls.

It is an object of the present disclosure to provide bit rate restriction for EVS codecs at a signalling path.

It is an object of the present disclosure to provide bit rate restriction at border gateways without impacting voice quality and reducing capacity of voice services.

It is an object of the present invention to enhance the network capabilities and provide better communication services.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

The diagrams are for illustration only, which thus is not a limitation of the present disclosure, and wherein.

DETAILED DESCRIPTION

Figure 1A:
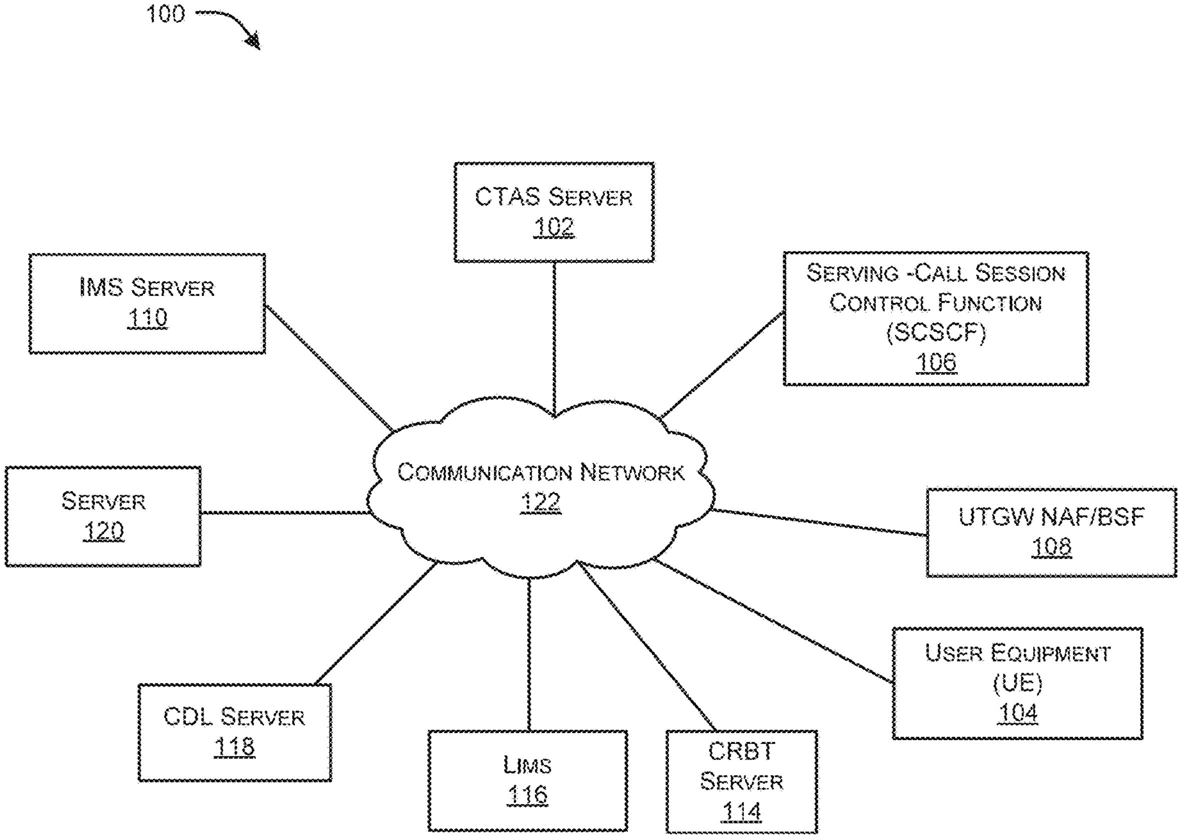
FIG. 1A illustrates exemplary network architecture in which or with which system of the present disclosure can be implemented, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure relates to wireless devices, and more particularly to systems and methods to provide bit rate restriction for voice services originating from and received by the wireless devices. As the wireless devices in a network are free to send any bit rate during codec negotiation procedure, it is imperative for an operator (IP Multimedia Subsystem) network to restrict the bit rate offered for voice communication by user equipment to 13.2 kbps so that excessive bandwidth consumption can be avoided. One of the possible solutions to achieve this is by transcoding higher bit rates to lower bit rates at border gateways. However, transcoding of RTP packets encoded in higher mode-sets is not advisable because transcoding leads to reduced voice quality and also reduces capacity of border gateways drastically. Therefore, it is desirable that the restriction of the bit rates happen at signalling path rather than at media path. To support this, it is mutually agreed with an operator of the network that Converge Telephony Application Server (CTAS) restricts the bit rate value to 13.2 kbps for all incoming and outgoing calls. The CTAS suggests that all incoming offnet calls contain maximum EVS bit rate of 13.2 kbps, as a Private Session Border Controller (PSBC) acts as a media anchoring point and thus manipulates incoming Session Description Protocol (SDP) capability. In addition, the PSBC manipulates about 25% (which is the percentage of incoming call from other operators) of extra computational cost related to optimum bit rate utilization to provide optimum bandwidth efficiency of the network.

A Voice over Long-Term Evolution (VOLTE) solution places Session Initiation Protocol (SIP) application servers (e.g. CTAS) at the centre of a voice core network, managing connectivity between subscribers and implementation of supplementary services. Ro interface based online charging may be implemented in a telecom network and Charging Data Records (CDRs) generated by application servers, such as the CTAS, may be used by a mediation system for reconciliation purpose.

The EVS codec supports operating points as shown in the following Table 1:

TABLE 1

| Bandwidth | Bit Rate Kbps |
|---|---|
| NarrowBand (NB) | 5.9, 7.2, 8, 9.6, 13.2, 16.4, 24.4 |
| WideBand (WB) | 5.9, 7.2, 8, 9.6, 13.2, 13.2 channel-aware, 16.4, 24.4, 32, 48, 64, 96, 128 (6.6~23.85 for AMR-WB IO) |
| Super WideBand (SWB) | 9.6, 13.2, 13.2 channel-aware, 16.4, 24.4, 32, 48, 64, 96, 128 |
| Fullband (FB) | 16.4, 24.4, 32, 48, 64, 96, 128 |

FIG. 1 illustrates exemplary network architecture 100 in which or with which system of the present disclosure can be implemented, in accordance with an embodiment of the present disclosure. As illustrated in representation 100, in FIG. 1, is a communication server 102 (the communication server hereinafter interchangeably referred to as Coverage Telephony Application Server or CTAS server 102 or system 102) that may be communicatively coupled to restrict offered bit rate to a User Equipment (UE) 104 during voice based services so that excessive bandwidth consumption of a wireless network is avoided. Various functional components of CTAS solutions are, for example, Converge Telephony Application Server (CTAS), Serving-Call Session Control Function (SCSCF), Access Elements and Clients: VOLTE Devices and operator 5G Voice Client, Operation, administration and management via operator Element Management System (EMS), Centralised Data Layer (CDL), UtGW (Network Application Function (NAF) and Binding Support Function (BSF)) and IMS Network. The VOLTE solution supports 5G LTE devices and Voice over LTE happens when a carrier allows a user to place a call over a LTE connection instead of older legacy voice networks.

In an embodiment, the communication server 102 may be operatively configured to a Serving Call Session Control Function (SCSCF) 106 via the communication network 122. The SCSCF 106 offers session and service control while using standard interfaces and application triggering mechanisms. Further, the communication server 102 may be operatively configured, via the communication network 122, to UtGW 108 that includes a Network Application Function (NAF) and a Bootstrapping Service Function (BSF). The NAF constitutes a HTTP or HTTPS-based service that requires authentication. Further, the BSF is an authenticator against which the user equipment 104 has to perform authentication. In another embodiment, the communication server 102 may be communicably operational or may be integrated with an Internet Protocol Multimedia Subsystem (IMS) server 110 via the communication network 122. Typically, application servers execute and host services within the IMS server 110 and an IMS application server may provide specific services to an end user. The specific services may include, for example, multiparty gaming, videoconferencing, messaging, community services, presence, and content sharing. Depending on its implementation, the IMS application server can host one or many IMS applications.

Further, the communication server 102 may be operatively configured to the user equipment 104. The UE 104 (also interchangeably referred to as a user device 104 terminal 104) may be a wireless device. The wireless device may be a mobile device that may include, for example, cellular telephone, such as a feature phone or smartphone and other devices. The UE 104 may not be limited to the above mentioned devices, but may include any type of device capable of providing wireless communication, such as a cellular phone, a tablet computer, a personal digital assistant (PDA), a personal computer (PC), a laptop computer, a media centre, a work station and other such devices.

In an embodiment, the communication server 102 may also be operatively configured to a Caller Ring Back Tone (CRBT) server 114. The CRBT server 114 may provide a service that allows customization of ring back tone on the UE 104. Further, the communication server 102 may be operatively configured to communicate with a Lawful Interception Management System (LIMS) server 116. The LIMS server 116 may enable the feature of providing Lawful Interception (LI). LI is a security process where a service provider or a network operator may collect and provide intercepted communications occurring within the wireless network. In an embodiment, the CTAS server 102 may be connected to a server 120 via the communication network 122.

Further, the communication server 102 may be operatively configured to communicate with a Centralized Data Layer (CDL) server 118. The CDL server 118 is configured for receiving data access requests from a CDL agent and interfaces with services layer which responds to data access requests. The CDL agent and the CDL server 118 act as a backbone for providing transporting of services between a client side and a server side. In addition, an instance of the CDL Server 118 exposes Virtual IP to CDL agents and works in a redundant mode so that the CDL server 118 instance is highly available.

In an embodiment, the communication network 122 may be a 5G network that may include at least one of a wireless network, a wired network or a combination thereof. The communication network 122 may be implemented as one of the different types of networks, such as Intranet, Local Area Network (LAN), Wide Area Network (WAN), Internet, and the like. Further, the communication network 122 can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Application Protocol (WAP), Automatic repeat request (ARQ), and the like. In an embodiment, the communication network 122 may pertain to a 5G network that may be facilitated through, for example, Global System for Mobile communication (GSM) network; a universal terrestrial radio network (UTRAN), an Enhanced Data rates for GSM Evolution (EDGE) radio access network (GERAN), an evolved universal terrestrial radio access network (E-UTRAN), a WIFI or other LAN access network, or a satellite or terrestrial wide-area access network such as a wireless microwave access (WIMAX) network. In an example embodiment, the communication network may enable 5G network based on subscription pertaining to the user/user device and/or through a Subscriber Identity Module (SIM) card. Various other types of communication network or service may be possible.

In an example, the communication network 122 may utilize different sort of air interface, such as a code division multiple access (CDMA), time division multiple access (TDMA), or frequency division multiple access (FDMA) air interface and other implementation. In an example embodiment, the wire-line user device may use wired access networks, exclusively or in combination with wireless access networks, for example, including Plain Old Telephone Service (POTS), Public Switched Telephone Network (PSTN), Asynchronous Transfer Mode (ATM), and other network technologies configured to transport Internet Protocol (IP) packets.

Figure 1B:
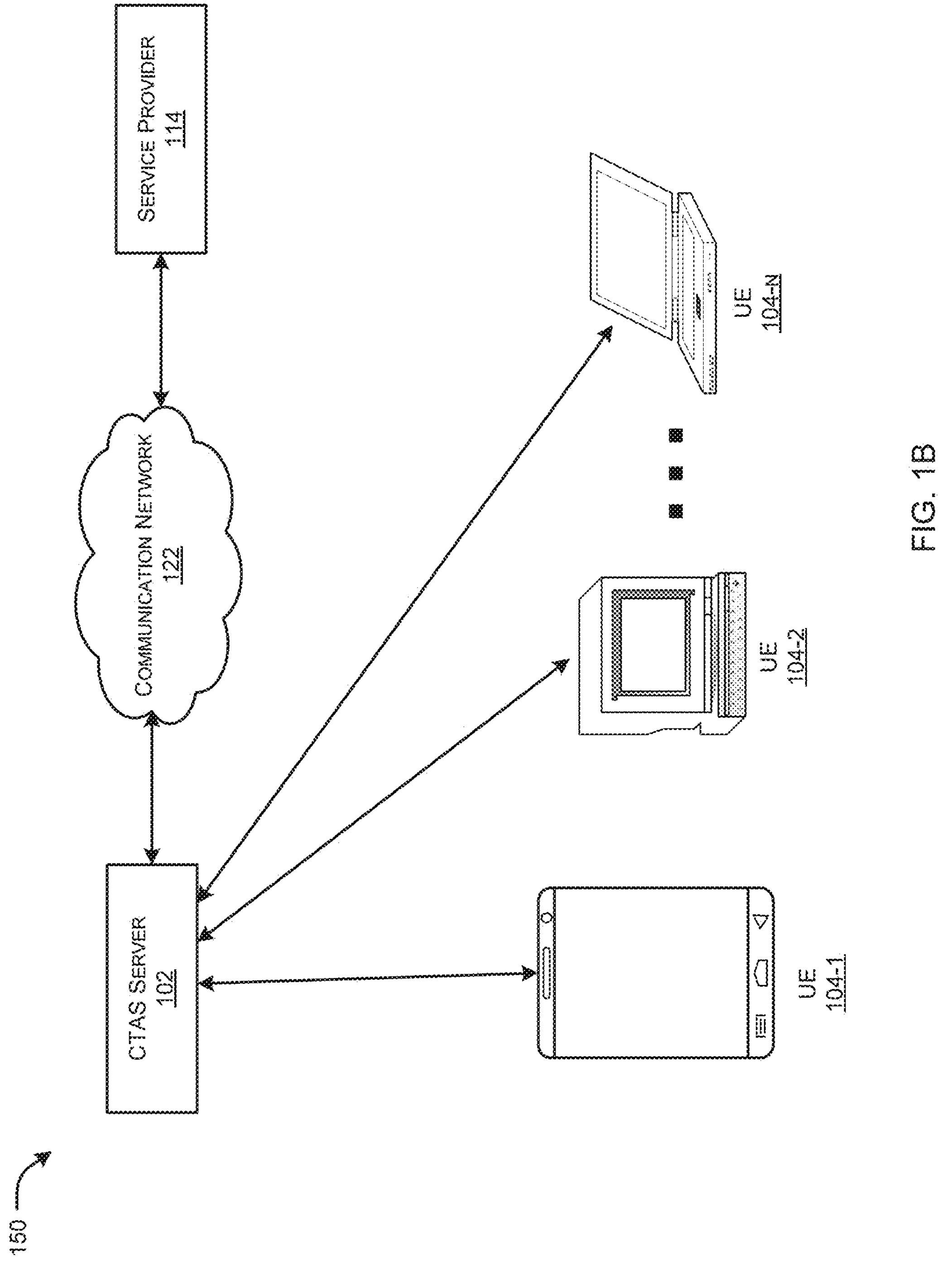
FIG. 1B illustrates an abstract exemplary network architecture with respect to FIG. 1A in which or with which system of the present disclosure can be implemented, in accordance with an embodiment of the present disclosure.

FIG. 1B illustrates an abstract exemplary network architecture 150 with reference to FIG. 1A in which or with which system of the present disclosure can be implemented, in accordance with an embodiment of the present disclosure. As is shown, the communication server 102 is operatively configured to communicate with a communication network 122. Further, the communication server 102 corresponds to a Converge Telephony Application Server (CTAS). The communication server 102 includes one or more processors coupled with a memory. The memory stores instructions which when executed by the one or more processors causes the communication server 102 to receive a data packet from the UE 104 in communication with the communication server 102. In an embodiment, the data packet includes a bit rate value of an EVS codec. The communication server 102 (or the processor there within) further compares the bit rate value of the received data packet to at least one of predefined bit rate configurations. The predefined bit rate configurations include multiple feasible variations for bit rate values of the EVS codec. In addition, when the bit rate value of the received data packet matches the at least one of predefined bit rate configurations, the communication server 102 alters the bit rate value of the received data packet for enhancing the EVS. In an embodiment, the communication server 102 facilitates reduction of a maximum bit rate of the EVS codec to a predetermined value when the bit rate value of the received data packet matches at least one of the predefined bit rate configurations.

In another embodiment, upon determination of a mismatch between the bit rate value of the received data packet and each of the predefined bit rate configurations, the communication server 102 performs at least one of: (a) reduce the maximum bit rate value to the predetermined value when a minimum bit rate value is less than the predetermined value, (b) replace the received bit rate value to the predetermined value when the minimum bit rate value is equal to the predetermined value, and (c) maintain the received bit rate value when the minimum bit rate value is higher than the predetermined value. In addition, the communication server 102 modifies only a bit rate parameter of the received data packet.

Figure 2:
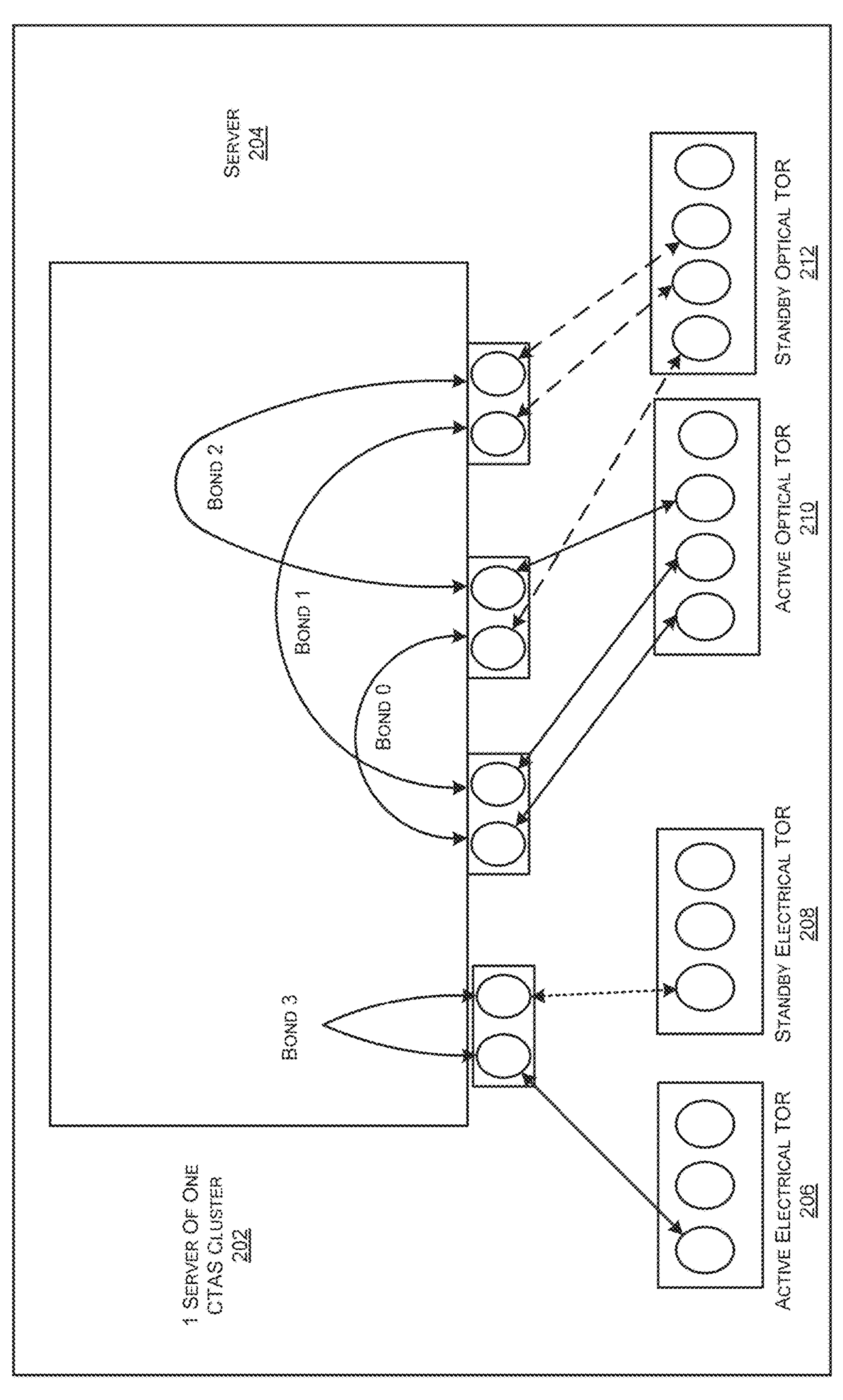
FIG. 2 illustrates a block diagram depicting network elements of a CTAS server, in accordance with an embodiment of the present disclosure.

FIG. 2 with reference to FIG. 1 illustrates a block diagram 200 depicting network elements of a CTAS server, in accordance with an embodiment of the present disclosure.

With reference to FIG. 2, Converged TAS (CTAS) may be an application server that is capable of handling VOLTE, Machine to Machine (M2M), Fixed-line (FLP) and Enterprise subscribers simultaneously. This makes the CTAS a unique type of TAS, which gives operational and engineering advantage in managing subscriber's growth in the VOLTE, fixed and enterprise domain in most efficient way. The CTAS may support online and offline charging for subscribers. However, Ro interface based online charging may be implemented in a network. CDRs generated by the CTAS may be used by a mediation system for reconciliation purpose.

In an embodiment, the CTAS server is implemented as a CTAS application solution in the system 100. In another embodiment, the CTAS application solution is a cluster-based solution that can be hosted on commercial off-the-shelf (COTS) servers. Each server of CTAS cluster 202 may consist of either eight servers or eight blades. A shown, each server has four logical interfaces, for example, Bond0, Bond1, Bond2 and Bond3, where each Bond is logically paired to two Ethernet ports to achieve link level redundancy. Bond0 interface is used by all eight blades for internal and database communication. Bond1 Interface is used by SIP applications present in all eight servers for SIP signalling. Bond2 interface is used for diameter communication by applications present in Blade3 onwards (From Blade3 to Blade8), whereas Bond3 interface is used for communication with Element Management System.

For Bond0, Bond1 and Bond2, 10G optical NIC cards may be used, whereas for Bond3, 1G electrical NIC cards may be used. In an embodiment, the CTAS may support both IPv4 and IPv6 protocols, where Bond2 and Bond3 interfaces may listen on either IPv6 or IPv4 at a given point of time and Bond1 interface may listen on IPv4 and IPv6 at the same time. Bond0 interface, which is not used for any external communication may support only IPv4. Since all elements in current ecosystem do not have IPv6 support and thus in initial phase of deployment, the CTAS may use IPv4 protocol.

In an embodiment, the CTAS server may be integrated with the Call Session Control Functions (CSCFs) for delivering multimedia telephony service (MMTel) supplementary services to the VOLTE customers as well as to the customers who are using 5G voice client over LTE or Wi-Fi. In addition, the CTAS server may be used to provide services related to M2M communication.

In an embodiment, with reference to FIG. 2, a CTAS server is illustrated with NIC configuration where 1G electrical ports is connected to an Active Electrical TOR 206 and to a Standby Electrical TOR 208. Further, 10G optical ports may be connected to an Active Optical TOR 210 and to Standby Optical TOR 212.

Figure 3:
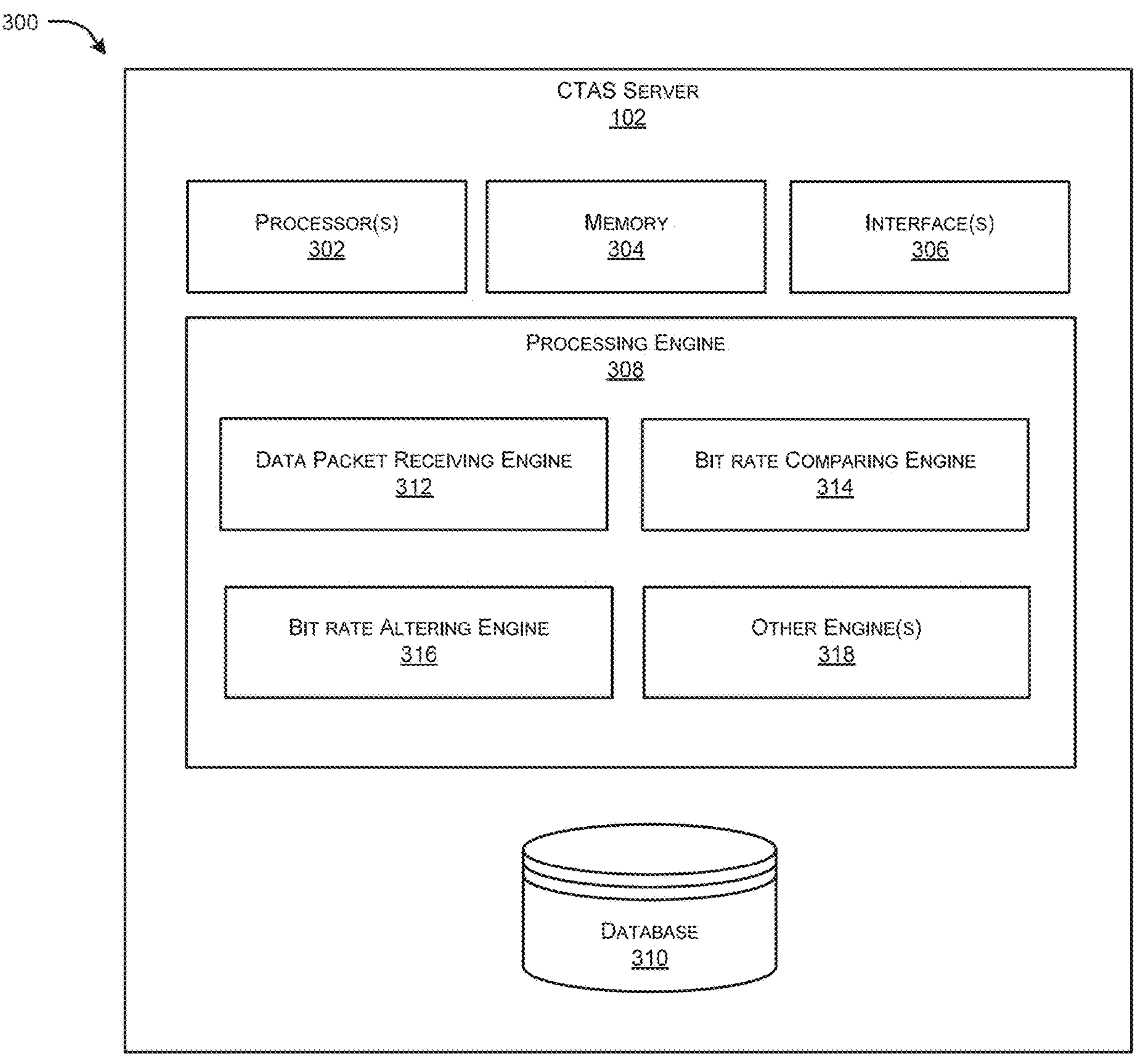
FIG. 3 illustrates an exemplary representation of a CTAS server (a communication server), in accordance with an embodiment of the present disclosure.

FIG. 3 illustrates an exemplary representation 300 of a CTAS server 102 (a communication server 102), in accordance with an embodiment of the present disclosure. In an embodiment, and as shown in FIG. 3, the CTAS server 102 may include one or more processors 302 coupled with a memory 304. The memory 304 may store instructions which when executed by the one or more processors 302 causes the CTAS server 102 to perform one or more functions.

The one or more processors 302 may be implemented as one or more microprocessors, microcomputers, microcontrollers, digital signal processors, central processing units, logic circuitries, and/or any devices that manipulate data based on operational instructions. Among other capabilities, the one or more processor(s) 302 may be configured to fetch and execute computer-readable instructions stored in memory 304 of the CTAS server 102. The memory 304 may store one or more computer-readable instructions or routines, which may be fetched and executed to create or share the data units over a network service. The memory 304 may comprise any non-transitory storage device including, for example, volatile memory such as RAM, or non-volatile memory such as EPROM, flash memory, and the like. The memory 304 may further store results after the execution of the instruction or routines as described earlier.

The CTAS server 102 may also comprise an interface(s) 306. The interface(s) 306 may comprise a variety of interfaces, for example, interfaces for data input and output devices, referred to as I/O devices, storage devices, SCADA, Sensors and the like. The interface(s) 306 may facilitate communication of the CTAS server 102 with various devices coupled to it. The interface(s) 306 may also provide a communication pathway for one or more components of the CTAS server 102. Examples of such components include, but are not limited to, a processing engine(s) 308 and a database 310.

The one or more processors 302 may be implemented as a combination of hardware and programming (for example, programmable instructions) to implement one or more functionalities of the one or more processors 302. In examples described herein, such combinations of hardware and programming may be implemented in several different ways. For example, the programming for the one or more processors 302 may be processor executable instructions stored on a non-transitory machine-readable storage medium and the hardware for the one or more processors 302 may comprise a processing resource (for example, one or more processors), to execute such instructions. In the present examples, the machine-readable storage medium may store instructions that, when executed by the processing resource, implement the one or more processors 302. In such examples, the CTAS server 102 may comprise the machine-readable storage medium storing the instructions and the processing resource to execute the instructions, or the machine-readable storage medium may be separate but accessible to the CTAS server 102 and the processing resource. In other examples, the one or more processors 302 may be implemented by an electronic circuitry. In an aspect, the database 310 may comprise data that may be either stored or generated as a result of functionalities implemented by any of the components of the processor 302 or the processing engines 308.

In an exemplary embodiment, the processing engine(s) 308 of the CTAS server 102 may include a data packet receiving engine 312, a bit rate comparing engine 314, a bit rate altering engine 316 and other engine(s) 318, wherein the other engines 318 may further include, without limitation, data receiving engine, storage engine, computing engine, or signal generation engine. The CTAS server 102 may be implemented using any or a combination of hardware components and software components.

In an implementation, the data packet receiving engine 312 may receive a data packet from a UE that is associated with a communication server. The data packet may include a bit rate value of an EVS codec.

In an embodiment, the bit rate comparing engine 314 may compares the bit rate value of the received data packet to at least one of predefined bit rate configurations. The predefined bit rate configurations may include multiple feasible variations for bit rate values of the EVS codec.

In another embodiment, the bit rate altering engine 316 may alter the bit rate value of the received data packet when the bit rate value of the received data packet matches the at least one of predefined bit rate configurations for enhancing the EVS. The bit rate altering engine 316 may reduce a maximum bit rate of the EVS codec to a predetermined value when the bit rate value of the received data packet matches at least one of the predefined bit rate configurations. Further, upon determination of a mismatch between the bit rate value of the received data packet and each of the predefined bit rate configurations, the CTAS server 102 may either reduce the maximum bit rate value to the predetermined value when a minimum bit rate value is less than the predetermined value or replace the received bit rate value to the predetermined value when the minimum bit rate value is equal to the predetermined value. Further, the CTAS server 102 may maintain the received bit rate value when the minimum bit rate value is higher than the predetermined value.

As may be appreciated, the CTAS server 102 may include a Session Manager (SM) that may act as core functional delivery module which is responsible for call processing and service chaining logic execution in case of the CTAS server 102. The SM may further include sub-modules such as call initiation module (not shown) for initiating a communication with a plurality of emergency services. The CTAS server 102 may further include an Operations and Management (OAM) Manager that may be configured for managing fault, configuration and performance aspects of the CTAS/network device. The OAM manager may provide operations and maintenance touch point to the system or the CTAS server 102. In addition, the CTAS server 102 may include a Database Manager (DM) that may manage database cluster where the CTAS server 102 may store subscriber specific service information. In an embodiment, a feature enhancement request that may be received may be stored persistently using the DM. Further, a default RBT may be replaced with a sponsored advertisement and an advertisement is rendered to a calling party. In addition, the advertisement may be rendered to the users who have not enrolled for CRBT subscription. The advertisements may be sponsored by corporations and may provide monetary benefit to service provider(s). The users may be provided with an option to opt out from either or both of the provided advertisement option and the CRBT service. In addition, the service provider(s) may not charge the user for airing the advertisements.

In an implementation, a Troubleshooting Manager (TM) may aggregate logs and may debug information from all the functional managers for trouble shooting. The TM may also provide flexibility to generate debug information, for example, as in a module wise, a process wise and a system wise manner.

Figure 4:
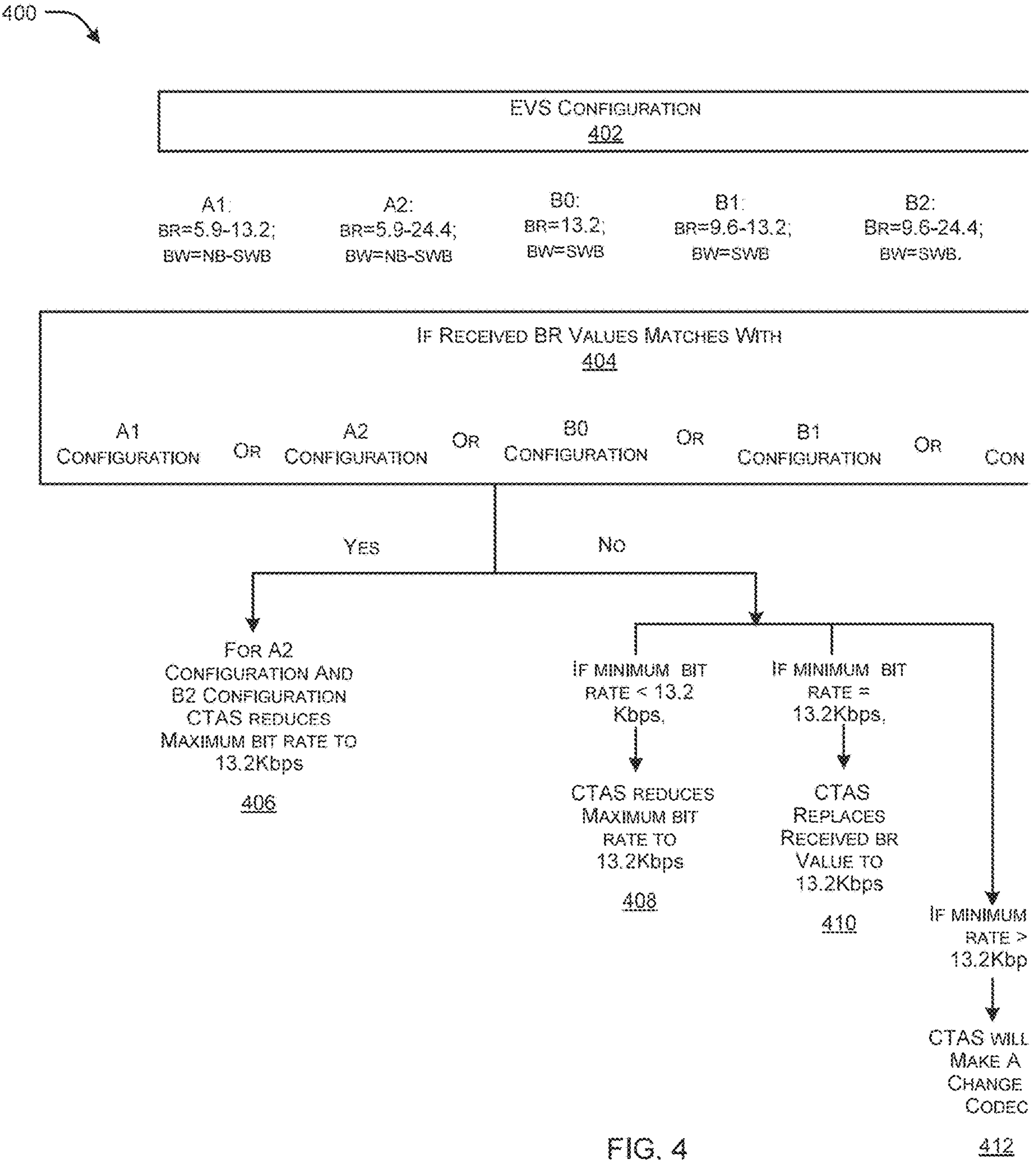
FIG. 4 illustrates an exemplary representation of a mechanism for determining and applying bit rate restriction by a CTAS server, in accordance with an embodiment of the present disclosure.

FIG. 4 illustrates an exemplary representation 400 of a mechanism for determining and applying bit rate restriction by a CTAS server, in accordance with an embodiment of the present disclosure. With reference to FIG. 4, the CTAS server 102 may at 402 check Enhanced Voice Services (EVS) codec in INVITE and compare offered EVS codec with below mentioned five configurations which are being prescribed to be supported by NG114 specification:

i). EVS Configuration A1: bit rate (br)=5.9-13.2; bandwidth (bw)=(narrowband) nb-(super wide band) swb.

ii). EVS Configuration A2: br=5.9-24.4; bw=nb-swb.

iii). EVS Configuration B0: br=13.2; bw=swb.

iv). EVS Configuration B1: br=9.6-13.2; bw=swb.

v). EVS Configuration B2: br=9.6-24.4; bw=swb.

With respect to the determined EVS configuration, the CTAS server 102 will perform any of the following functions:

a) If received BR values, at 404, matches with any of the above mentioned 5 configurations, then only for A2 configuration and B2 configuration, the CTAS server 102, at 406, may reduce maximum bit rate to 13.2 Kbps.

b) However, if received BR values do not match with any of the above mentioned five configurations, then the CTAS server 102 will consider that offering as a wildcard. Further, for these wildcard offerings:

a) If minimum value of bit rate is less than 13.2 Kbps, then the CTAS server 102 will reduce maximum bit rate to 13.2 Kbps, at 408.

b) If minimum value of bit rate is equal to 13.2 Kbps, then CTAS server 102 will replace received br values with br=13.2 Kbps, at 410.

c) If minimum value of bit rate is more than 13.2 Kbps, then the CTAS server 102 will not make any changes and will forward the codecs as received, at 412.

In an embodiment, each of the above mentioned functionalities can be either enabled or disabled respectively by setting value of parameter RT_DO_EVS_BIT_RATE_CHANGES as either TRUE or FALSE. As may be appreciated, the CTAS server 102 will neither add nor modify any other parameters apart from "br" parameter in the fmtp line corresponding to the EVS codec. Also, if the received SDP offer contains more than one EVS codec, solution proposed here will be applicable for every EVS codec received in the offer.

Figure 5:
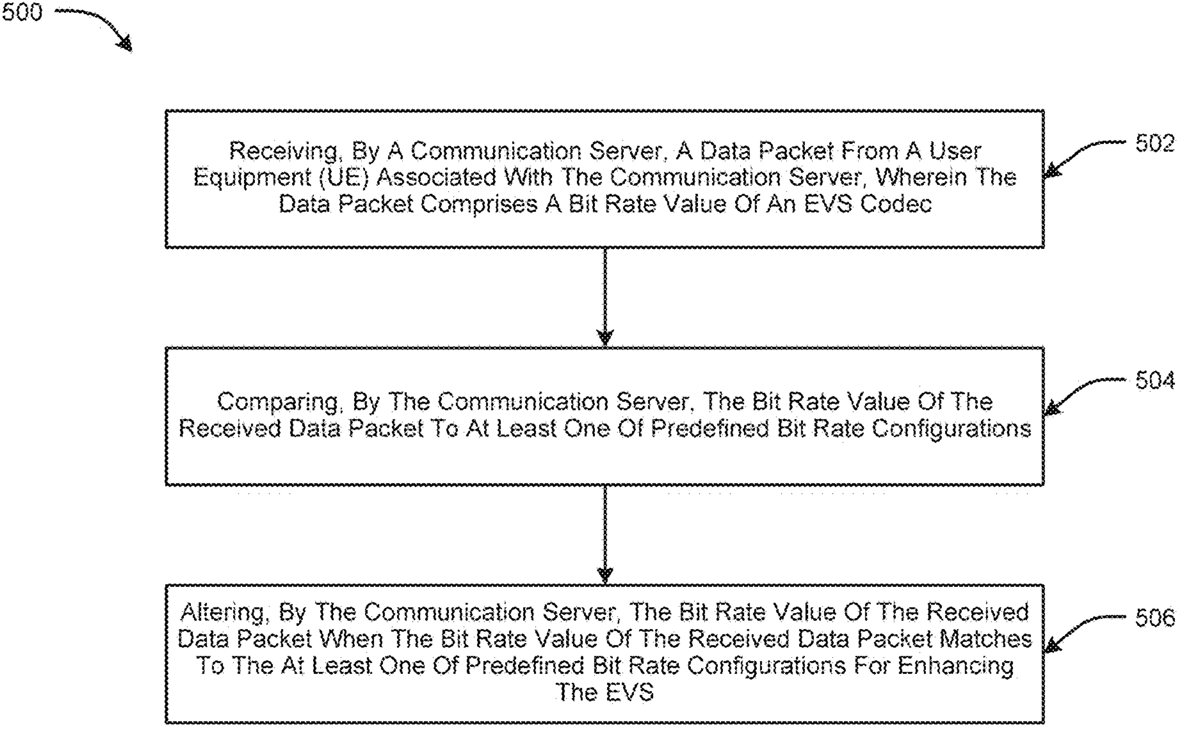
FIG. 5 illustrates a process flow mechanism for restricting a bit rate for enhanced voice services (EVS), in accordance with embodiments of the present disclosure.

FIG. 5 illustrates a process flow mechanism 500 for restricting a bit rate for enhanced voice services (EVS), in accordance with embodiments of the present disclosure. With respect to FIG. 5, at block 502, a communication server (e.g., 102) may receive a data packet from a user equipment (UE) (e.g., 104) associated with the communication server 102. The UtGW 108 operably coupled to the communication server 102 may authenticate the UE (104). Further, the IMF server 110 operably coupled with the communication server 102 may process the requests generated by the UE (e.g., 104) and restrict the bit rate offered by the UE 104 (end users) to 13.2 so that excessive bandwidth consumption can be avoided. Further, the data packet received by the communication server 102 may include a bit rate value of an EVS codec. At block 504, the bit rate value of the received data packet may be compared by the communication server 102 to at least one of predefined bit rate configurations. At block 506, the bit rate value of the received data packet may be altered by the communication server 102 when the bit rate value of the received data packet matches with the at least one of predefined bit rate configurations for enhancing the EVS.

Figure 6:
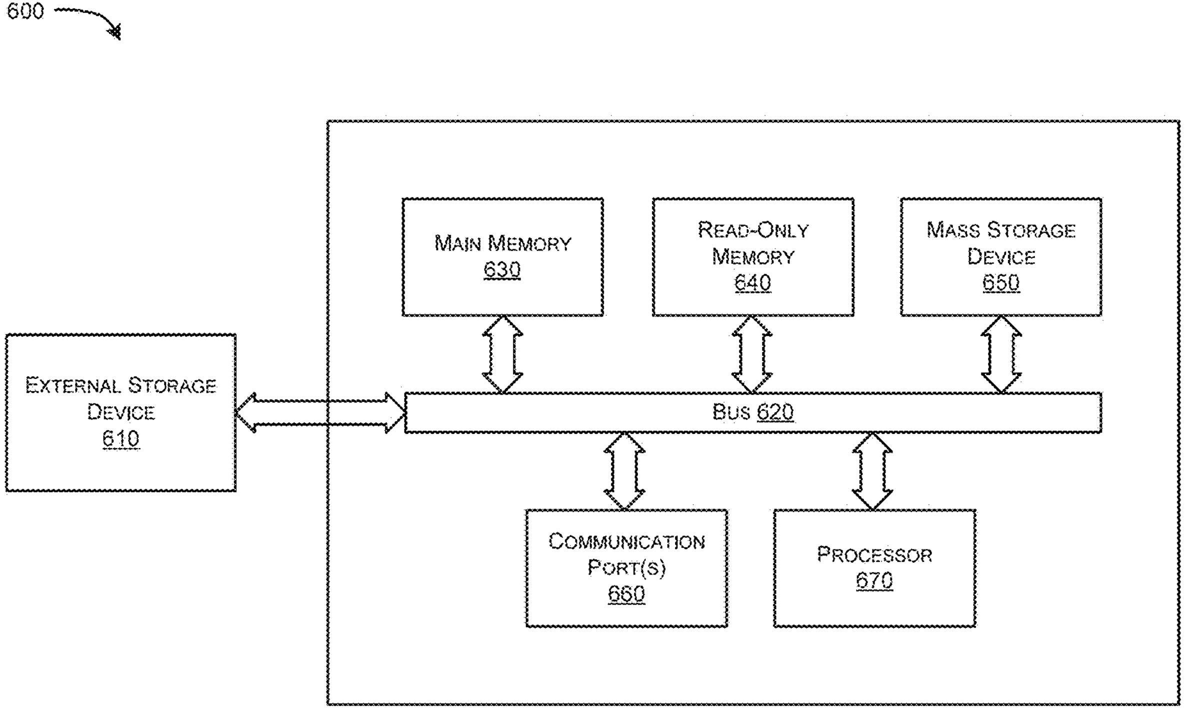
FIG. 6 illustrates an exemplary computer system in which or with which embodiments of the present invention can be utilized in accordance with embodiments of the present disclosure.

FIG. 6 illustrates an exemplary computer system 600 in which or with which embodiments of the present invention can be utilized in accordance with embodiments of the present disclosure. As shown in FIG. 6, computer system 600 can include an external storage device 610, a bus 620, a main memory 630, a read only memory 640, a mass storage device 670, communication port(s) 660, and a processor 670. A person skilled in the art will appreciate that the computer system may include more than one processor and communication ports. Processor 670 may include various modules associated with embodiments of the present invention. Communication port (680 can be any of an RS-232 port for use with a modem based dialup connection, a 10/100 Ethernet port, a Gigabit or 10 Gigabit port using copper or fiber, a serial port, a parallel port, or other existing or future ports. Communication port (680 may be chosen depending on a network, such a Local Area Network (LAN), Wide Area Network (WAN), or any network to which computer system connects. Memory 630 can be Random Access Memory (RAM), or any other dynamic storage device commonly known in the art. Read-only memory 640 can be any static storage device(s) e.g., but not limited to, a Programmable Read Only Memory (PROM) chips for storing static information e.g., start-up or BIOS instructions for processor 670. Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g. an array of disks (e.g., SATA arrays).

Bus 620 communicatively couples processor(s) 670 with the other memory, storage and communication blocks. Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, joystick and a cursor control device, may also be coupled to bus 620 to support direct operator interaction with a computer system. Other operator and administrative interfaces can be provided through network connections connected through communication port 660. The external storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE PRESENT DISCLOSURE

The present disclosure provides bit rate restriction for voice services originating from and received by wireless devices.

The present disclosure provides a codec selection mechanism to improve bandwidth consumption of a wireless network.

The present disclosure provides mechanisms for selecting varying Enhanced Voice Services (EVS) codecs for voice calls.

The present disclosure provides bit rate restriction for EVS codecs at a signalling path.

The present disclosure provides bit rate restriction at border gateways without impacting voice quality and reducing capacity of voice services.

The present disclosure enhances the network capabilities and provides better communication services.

We claim:

1. A system for restricting a bit rate for enhanced voice services (EVS), the system comprising:

a communication server communicatively coupled to a communication network, wherein the communication server comprises one or more processors coupled with a memory, and wherein the memory stores instructions which when executed by the one or more processors causes the communication server to:

receive a data packet from a user equipment (UE) in communication with the communication server, wherein the data packet comprises a bit rate value of an EVS codec;

compare the bit rate value of the received data packet to a stored set of predefined discrete bit rate configurations; and alter the bit rate value of the received data packet to a predetermined bit rate value when the bit rate value of the received data packet matches the at least one of the predefined discrete bit rate configurations.

2. The system as claimed in claim 1, wherein the predefined bit rate configurations comprise multiple feasible variations for bit rate values of the EVS codec.

3. The system as claimed in claim 1, wherein the EVS codec enhances communication quality of voice services.

4. The system as claimed in claim 1, wherein a maximum bit rate of the EVS codec is reduced to a predetermined value when the bit rate value of the received data packet matches to at least one of the predefined bit rate configurations.

5. The system as claimed in claim 4, wherein in response to the bit rate value of the received data packet mismatching with each of the predefined bit rate configurations, the one or more processors causes the communication server to perform at least one of:

reduce the maximum bit rate value to the predetermined value when a minimum bit rate value is less than the predetermined value;

replace the received bit rate value to the predetermined value when the minimum bit rate value is equal to the predetermined value; and maintain the received bit rate value when the minimum bit rate value is higher than the predetermined value.

6. The system as claimed in claim 1, wherein the communication server corresponds to a Converge Telephony Application Server (CTAS).

7. The system as claimed in claim 1, wherein the communication server is configured to modify a bit rate parameter of the received data packet.

8. A method for restricting a bit rate for enhanced voice services (EVS), the method comprising:

receiving, by a communication server, a data packet from a user equipment (UE) associated with the communication server, wherein the data packet comprises a bit rate value of an EVS codec, and wherein the EVS codec enhances communication quality of voice services;

comparing, by the communication server, the bit rate value of the received data packet to a stored set of predefined discrete bit rate configurations; and altering, by the communication server, the bit rate value of the received data packet to a predetermined bit rate value when the bit rate value of the received data packet matches the at least one of the predefined discrete bit rate configurations.

9. The method as claimed in claim 8, wherein the predefined bit rate configurations comprises multiple feasible variations for bit rate values of the EVS codec.

10. The method as claimed in claim 8, further comprising: reducing, by the communication server, a maximum bit rate of the EVS codec to a predetermined value when the bit rate value of the received data packet matches to at least one of the predefined bit rate configurations.

11. The method as claimed in claim 10, further comprising:

upon the bit rate value of the received data packet mismatching to each of the predefined hit rate configurations, the method comprises at least one of:

reducing, at the communication server, the maximum bit rate value to the predetermined value when a minimum bit rate value is less than the predetermined value;

replacing, at the communication server, the received bit rate value to the predetermined value when the minimum bit rate value is equal to the predetermined value; and maintaining, at the communication server, the received bit rate value when the minimum bit rate value is higher than the predetermined value.

12. The method as claimed in claim 8, wherein the communication server corresponds to a Converge Telephony Application Server (CTAS).

13. The method as claimed in claim 8, wherein the communication server is configured to modify a bit rate parameter of the received data packet.

14. A user equipment (UE) communicatively coupled to a communication server, the UE comprising:

one or more primary processors communicatively coupled to one or more processors of the communication server, the one or more primary processors coupled with a memory, wherein said memory stores instructions which when executed by the one or more primary processors causes the UE to:

transmit a data packet to the communication server via a communication network, wherein the communication server is configured to:

receive the data packet from the UE, wherein the data packet comprises a bit rate value of an enhanced voice services (EVS) codec;

compare the bit rate value of the received data packet to a stored set of predefined discrete bit rate configurations; and alter the bit rate value of the received data packet to a predetermined bit rate value when the bit rate value of the received data packet matches the at least one of the predefined discrete bit rate configurations.

15. A non-transitory computer-readable medium comprising processor-executable instructions that causes a processor to:

receive a data packet from a user equipment (UE) in communication with a communication server, wherein the data packet comprises a bit rate value of an enhanced voice services (EVS) codec;

compare the bit rate value of the received data packet to a stored set of predefined discrete bit rate configurations; and alter the bit rate value of the received data packet to a predetermined bit rate value when the bit rate value of the received data packet matches the at least one of the predefined discrete bit rate configurations.

* * * * *